US007712220B2

(12) United States Patent
Cheng

(10) Patent No.: US 7,712,220 B2
(45) Date of Patent: May 11, 2010

(54) METHOD OF A DOUBLE STARWHEEL UNIT IN MULTIPLE ROWS WITH A MULTI-HOLE MANNER, AN INSTRUMENT AND THE LIKE

(75) Inventor: Shun-Sheng Cheng, Taipei (TW)

(73) Assignee: Sine San AIE Technology Co., Ltd., Taipei (TW)

( * ) Notice: Subject to any disclaimer, the term of this patent is extended or adjusted under 35 U.S.C. 154(b) by 314 days.

(21) Appl. No.: 11/905,994

(22) Filed: Oct. 9, 2007

(65) Prior Publication Data

US 2008/0029955 A1 Feb. 7, 2008

Related U.S. Application Data

(62) Division of application No. 10/724,131, filed on Dec. 1, 2003, now abandoned.

(51) Int. Cl.

| | |
|---|---|
| ***B21D 53/26*** | (2006.01) |
| ***B21D 1/02*** | (2006.01) |
| ***B21D 39/03*** | (2006.01) |
| ***B65H 3/06*** | (2006.01) |
| ***B65H 29/20*** | (2006.01) |
| ***B29B 9/00*** | (2006.01) |
| ***B29C 45/14*** | (2006.01) |
| ***B28B 3/06*** | (2006.01) |

(52) U.S. Cl. ............................ 29/894; 29/895; 29/428; 29/464; 29/527.1; 271/109; 271/314; 264/5; 264/242; 264/297.1; 264/297.2; 264/297.4

(58) Field of Classification Search .................. 29/894, 29/895, 895.2, 895.21, 895.22, 428, 455.1, 29/463, 464, 527.1; 271/109, 275, 314; 347/104; 492/33, 40; 264/5, 510, 570, 241, 242, 297.1, 264/297.2, 297.4

See application file for complete search history.

(56) References Cited

U.S. PATENT DOCUMENTS

| | | | | |
|---|---|---|---|---|
| 6,223,578 B1 * | 5/2001 | Kamijo | ........................ | 72/336 |
| 7,086,730 B2 * | 8/2006 | Aoki | .......................... | 347/104 |

* cited by examiner

*Primary Examiner*—David P Bryant
*Assistant Examiner*—Alexander P Taousakis
(74) *Attorney, Agent, or Firm*—Rosenberg, Klein & Lee

(57) ABSTRACT

A method of a double starwheel unit in multiple rows with a multi-hole manner, an instrument and the like are disclosed. The double starwheel unit has a sleeve and two starwheel parallel-arranged and connecting the sleeve. The instrument has a plate-like assembly fixture and an orientation mechanism. The plate-like assembly fixture has a plurality of strip-like tools. The method combines the strip-like tools with the plate-like assembly fixture and a plurality of module holes, presses an exterior mold on the starwheel onto upper and lower surfaces of the plate-like assembly fixture, and injects a working fluid to shape the double starwheel units. The strip-like tools are engaged or disengaged by the orientation mechanism.

4 Claims, 9 Drawing Sheets

METHOD OF A DOUBLE STARWHEEL UNIT IN MULTIPLE ROWS WITH A MULTI-HOLE MANNER, AN INSTRUMENT AND THE LIKE

The application is a Divisional of application Ser. No. 10/724,131, filed on Dec. 1, 2003 now abandoned.

BACKGROUND OF THE INVENTION

1. Field of the Invention

The present invention relates to a method of a double starwheel unit in multiple rows with a multi-hole manner, an instrument and the like, and particularly relates to a method of a double starwheel unit made integrally in one piece, an instrument and the like.

2. Background of the Invention

An ink-jet printer usually uses a starwheel unit to increase friction while pushing a sheet of paper out from an outlet thereof after printing. With respect to FIG. 1, a first conventional starwheel unit 1' is provided and includes a sleeve 10' and a starwheel 14' disposed in a middle of the sleeve 10'. The sleeve 10' has a center hole 15' formed therein for wrapping a spring to be parallel with the outlet of the printer. The printer further includes a second starwheel unit (not shown), different from the first starwheel unit 10' and engaging with a concave-convex structure, which is arranging on the sleeve 10'.

The ink-jet printer requires many first conventional starwheel units 1' for average loading on the paper; thus the cost and the assembly steps thereof increase. The ink-jet printer with the second conventional starwheel unit, which increases loading on the paper by the concave-convex structure, encounters more difficulties with module designing and sleeve engaging process than a printer with the first conventional starwheel unit 1', and further has so many problems both of yield rates of the sleeve engaging process and failure rates that cost of the ink-jet printer with the second conventional starwheel unit cannot be diminished.

SUMMARY OF INVENTION

The primary object of the invention is therefore to specify a method of a double starwheel unit in multiple rows with a multi-hole manner, an instrument and the like, so as to diminish the cost and manufacturing steps, to increase the yield rate and to drop the failure rate.

According to the invention, this object is achieved by a double starwheel unit including a sleeve and two starwheels. The sleeve has an upper portion, a middle portion and a lower portion sequentially arranged, and the sleeve further includes a central hole throughout the upper portion, the middle portion and the lower portion. The two starwheels are respectively defined as a first and a second starwheels parallel-arranged in an upper-and-lower manner. The two starwheels respectively have a first and a second external tooth 16 and a first and a second internal edge. The first internal edge of the first starwheel is disposed between the upper portion and the middle portion, and the second internal edge of the second starwheel is disposed between the middle portion and the lower portion. The first and the second internal edges respectively have a first and a second gear-wheel hole formed thereon and relating to the central hole of the sleeve, and the first and the second external teeth are exposed by the sleeve.

This object is further achieved by an instrument adopted for fabricating a plurality of double starwheel units in multiple rows with a multi-hole manner. The instrument includes a plate-like assembly fixture and an orientation mechanism.

The plate-like assembly fixture includes a plurality of strip-like tools parallel to each other and a plurality of connection mechanisms for combining the strip-like tools with the plate-like assembly fixture. Each strip-like tool has a plurality of recesses respectively formed on two opposing longitudinal sides. The plate-like assembly fixture includes a module hole formed both by each of the recesses of the strip-like tools and a next recess relating thereto and the double starwheel units is oriented therein. The orientation mechanism combines the strip-like tools closely with and parallel to the plate-like assembly fixture, or to separate the strip-like tools from the plate-like assembly fixture.

This object is also achieved by a method adopted for fabricating a plurality of double starwheel units in multiple rows with a multi-hole manner, including: (a) bringing a plurality of strip-like tools increasingly closer together and parallel to each other for combination into a plate-like assembly fixture, the strip-like tools each having a plurality of recesses formed on two opposing longitudinal sides thereof, and a plurality of module holes formed by each of the recesses and the next recess relating thereto; (b) retaining two sheet-like substrates against an upper surface and a lower surface of the plate-like assembly fixture, the two sheet-like substrates each having a plurality of starwheels respectively relating to the module holes, of which each has a circumference ranging between those of the gear-wheel hole and an external teeth of each of the starwheels; (c) covering the plate-like assembly fixture with an exterior mold, and closely pressing the external teeth arranged on the upper and lower surfaces of the plate-like assembly fixture; (d) injecting a working fluid through an injection hole in the exterior mold and into the module holes therein, and transforming the working fluid into a sleeve to connect the starwheels of the two sheet-like substrates on the upper and the lower surfaces of the plate-like assembly fixture relating to each other for shaping a plurality of double starwheel units respectively oriented in the module holes; (e) removing the exterior mold; (f) taking a plurality of residents of the two sheet-like substrates off; and (g) separating the strip-like tools from and keeping the double starwheel units.

To provide a further understanding of the invention, the following detailed description illustrates embodiments and examples of the invention. Examples of the more important features of the invention thus have been summarized rather broadly in order that the detailed description thereof that follows may be better understood, and in order that the contributions thereto may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE EMBODIMENTS

Figure 1:
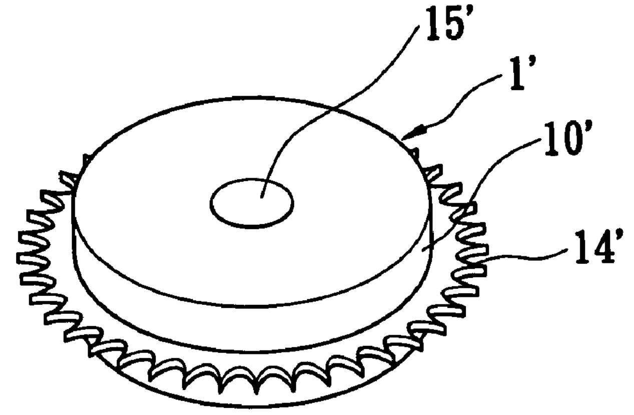
FIG. 1 PRIOR ART
FIG. 1 is a perspective view of a conventional starwheel unit.
Figure 2:
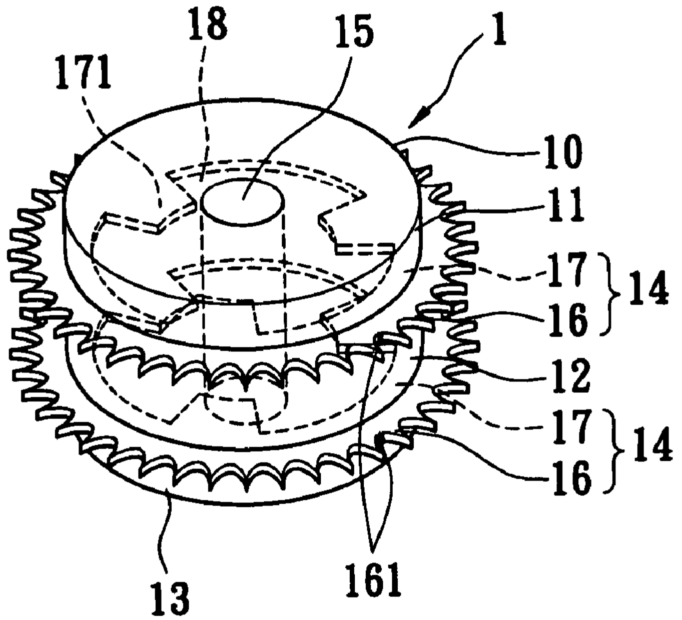
FIG. 2 is a perspective view of the double starwheel unit according to the present invention.

With respect to FIG. 2, the present invention provides a double starwheel unit 1 including a sleeve 10 and two starwheels 14. The sleeve 10 is made of a plastic material, and has an upper portion 11, a middle portion 12 and a lower portion 13 sequentially arranged. The sleeve 10 further includes a central hole 15 throughout the upper portion 11, the middle portion 12 and the lower portion 13. The sleeve 10 is cylindrical in shape, and the middle portion 12 is thicker than the upper portion 11 and the lower portion 13.

Figure 3:
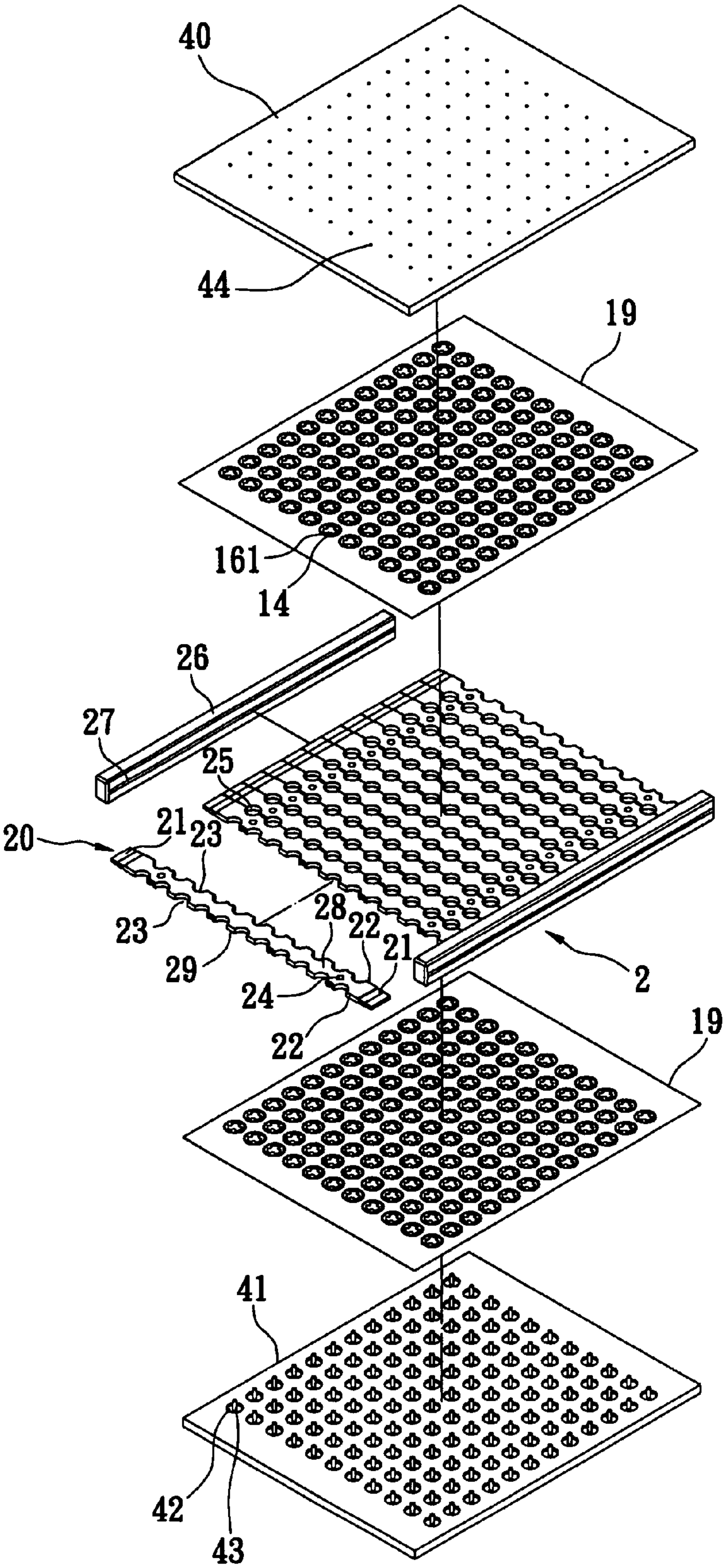
FIG. 3 is an enlarged-decomposition view according to a plate-like assembly fixture and an exterior mold respectively relating to a sheet-like substrate of a first and a second starwheels according to the present invention.

The two starwheels 14 respectively define as a first and a second starwheels parallel-arranged in an upper-and-lower manner. The two starwheels 14 respectively have first and second external teeth 16 and first and second internal edges 17. The first internal edge 17 of the first starwheel is disposed between the upper portion 11 and the middle portion 12, and the second internal edge 17 of the second starwheel is disposed between the middle portion 12 and the lower portion 13. The first and the second internal edges 17 respectively have first and second gear-wheel holes 18 formed therein and relating to the central hole 15 of the sleeve 10. The first and the second external teeth 16 are exposed by the sleeve 10. Each first and second internal edge 17 has a plurality of projections 171 protruding inwardly and arranged symmetrically. Each starwheel 14 is shaped like a plate, and each first and second external tooth 16 has a conjunction point 161 connecting each of the two starwheels 14 to a sheet-like substrate 19 (see FIG. 3).

Referring to FIGS. 3-6, the present invention provides an instrument adopted for fabricating a plurality of double starwheel units 1 in multiple rows with a multi-hole manner. The instrument includes a plate-like assembly fixture 2 and an orientation mechanism 3. The plate-like assembly fixture 2 includes a plurality of strip-like tools 20 parallel to each other and a plurality of connection mechanisms arranged and connecting alternatively between the strip-like tools 20. Each connection mechanism includes two clips 26 parallel to each other, and the two clips 26 respectively having two embedded slots 27 relating to each other. Each strip-like tool 20 has two opposing ends 21 clamped by the two clips 26 into the two embedded slots 27 in a one-on-one manner to combine the strip-like tools 20 with the plate-like assembly fixture 2. Each strip-like tool 20 has a plurality of recesses 23 respectively formed on two opposing longitudinal sides 22. The plate-like assembly fixture 2 includes a module hole 25 formed both by a recess 23 of a strip-like tool 20 and the next recess 23 relating thereto. Each double starwheel unit 1 and each strip-like tool 20 includes an orientation hole 24 formed therein and adjacent to each of the two opposing ends 21.

The plate-like assembly fixture 2 connects and covers an exterior mold 4 (see FIG. 4), which includes an upper mold 40 and a lover mold 41, a plurality of module slots 42, a plurality of posts 43 arranged in the module slots 42, and a plurality of injection holes 44 communicating with the module slots 42, for covering the plate-like assembly fixture 2 and so that the exterior mold 4 closely presses the external teeth 16 of each of the double starwheel units 1 arranged on each of upper and lower surfaces 28, 29 of the plate-like assembly fixture 2. The gear-wheel hole 18 communicates with the module hole 25, which has a circumference ranging between that of the gear-wheel hole 18 and the external teeth 16. Each module slot 42 corresponds to the module hole 25 and each post 43 penetrates through the module hole 25 and the gear-wheel hole 18. A working fluid is injected through injection holes 44 in the exterior mold 4 and into module hole 25. The working fluid transforms into the sleeve 10 and the posts 43 each retain the central hole 15 therein. The sleeve 10 connects the two double starwheels 14 arranged relatively on each of the upper and lower surfaces 28, 29 of the plate-like assembly fixture 2 to form a double starwheel unit 1 oriented in the module hole 25.

Figure 5:
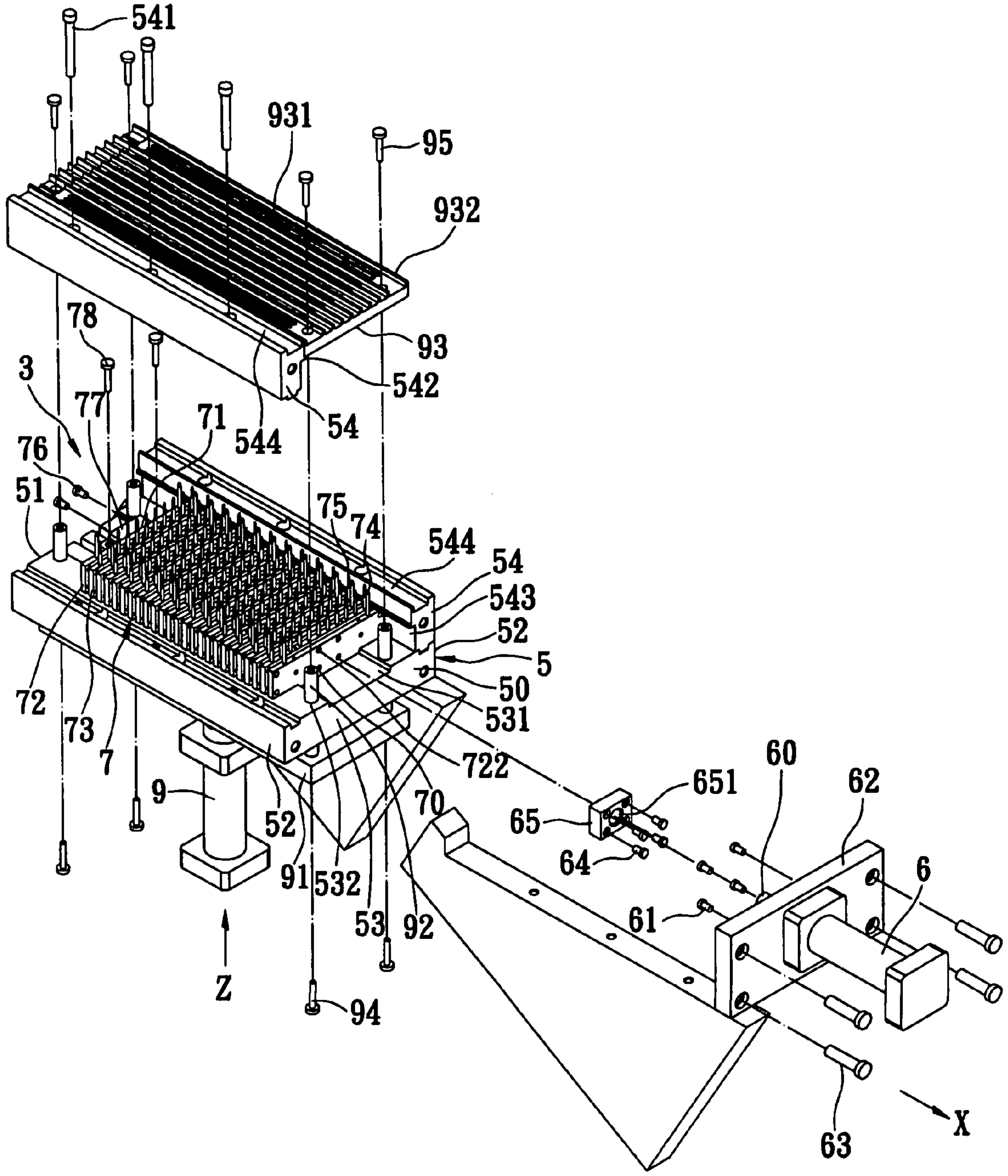
FIG. 5 is an enlarged-decomposition view according to an orientation mechanism while a retractable assembly mechanism in a stretched state according to the present invention.
Figure 6:
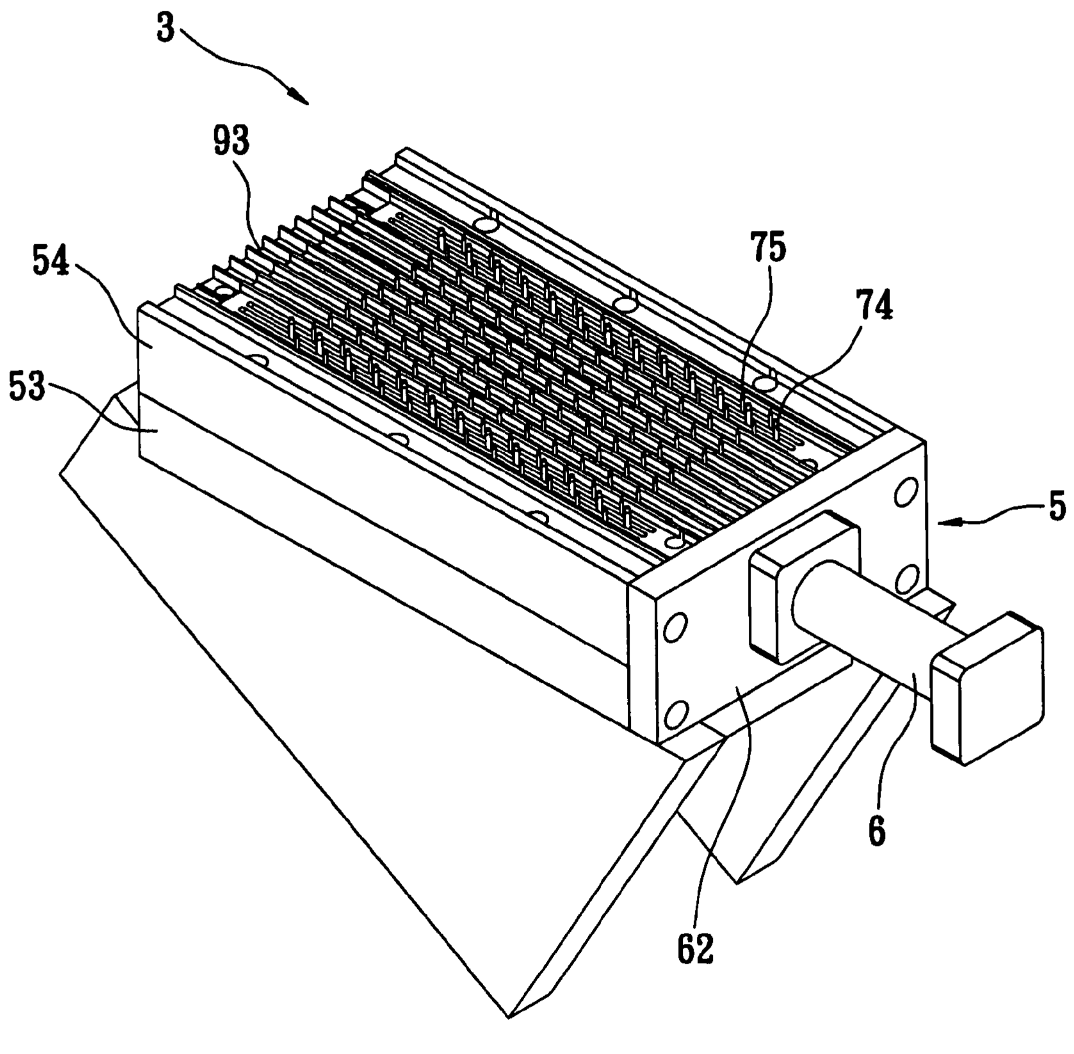
FIG. 6 is a perspective view according to the orientation mechanism while the retractable assembly mechanism is in the extended state according to the present invention.

The orientation mechanism 3 is used for engaging with or disengaging from a strip-like tool 20 and the next strip-like tool 20 relating thereto. Referring to FIG. 5 and FIG. 6, the orientation mechanism 3 includes a housing 5, a horizontal reciprocal power source 6 and a retractable assembly mechanism 7. The housing 5 has a front side 50 and a rear side 51 relating to the front side 50. The horizontal reciprocal power source 6 is disposed on the front side 50 of the housing 5 and has a lateral telescopic lever 60 parallel to a horizontal direction X of the housing 50. The retractable assembly mechanism 7 includes a front-end face 70 and a rear-end face 71 relating to the front-end face 70. The front-end face 70 connects to the lateral telescopic lever 60 and slides on the housing 5, and the rear-end face 71 connects to the rear side 51 of the housing 5.

Figure 7:
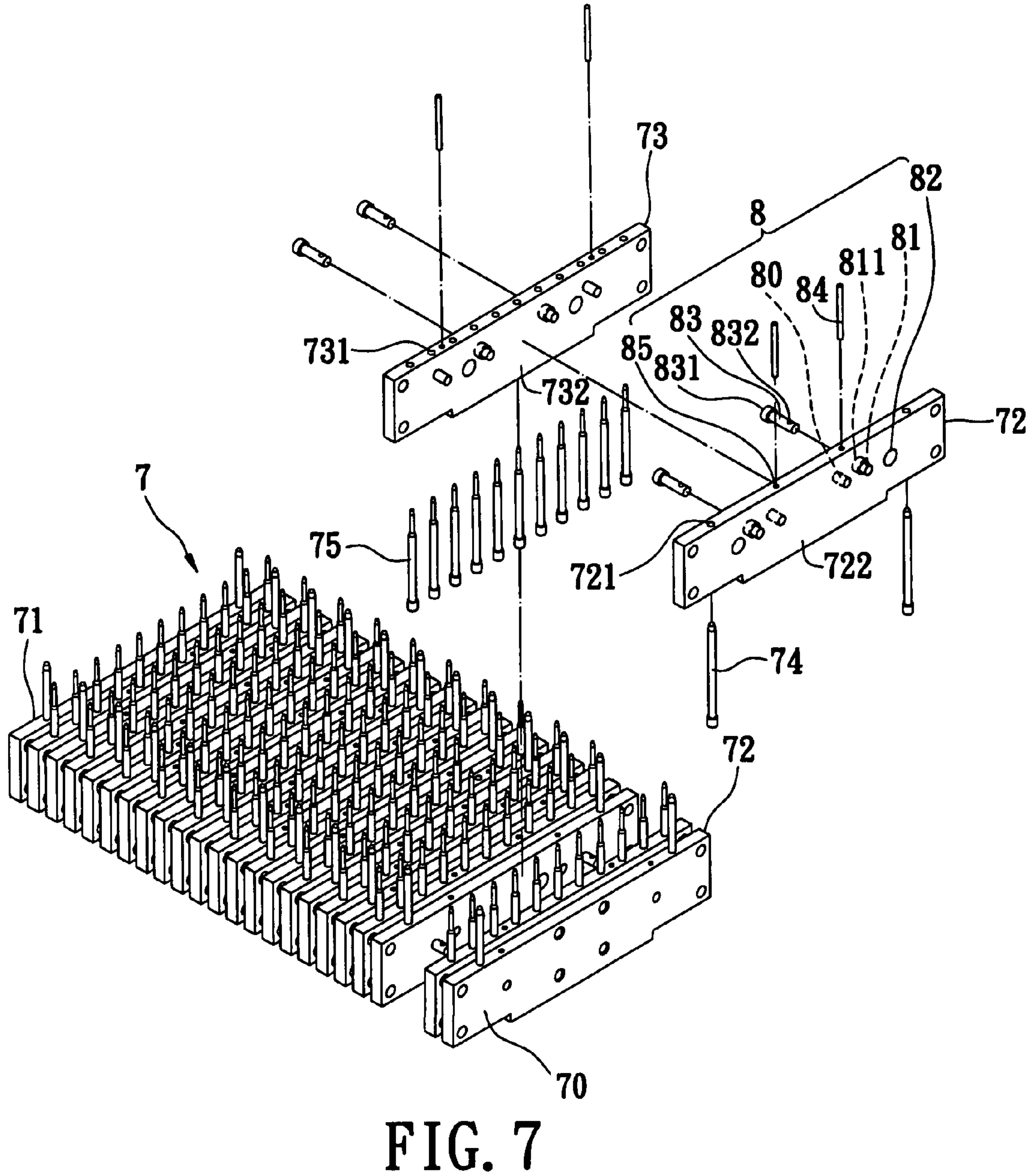
FIG. 7 is an enlarged-decomposition view of the retractable assembly mechanism according to the present invention.
Figure 8:
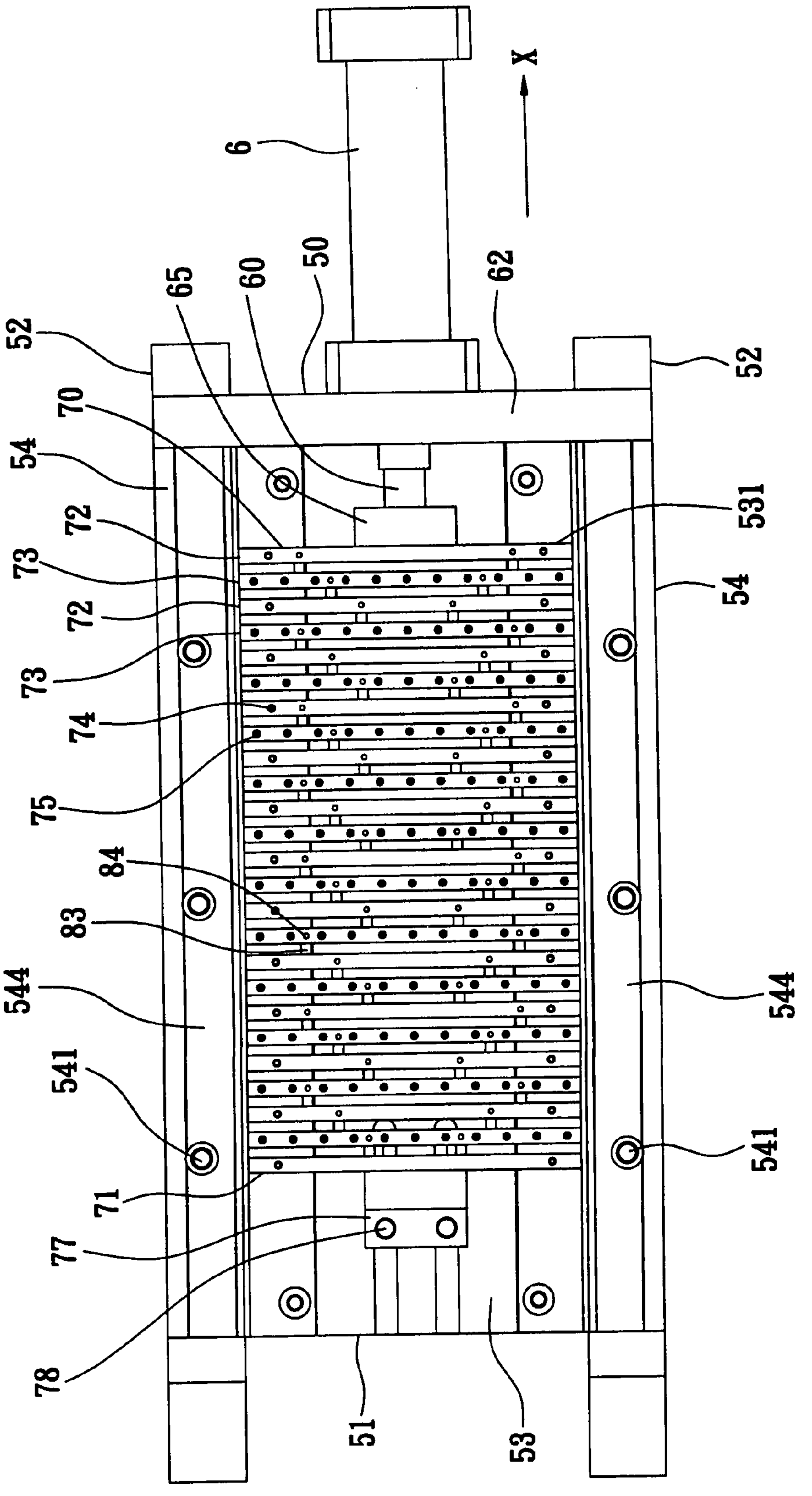
FIG. 8 is a top view without a top plate according to the orientation mechanism while the retractable assembly mechanism in the extended state according to the present invention.
Figure 9:
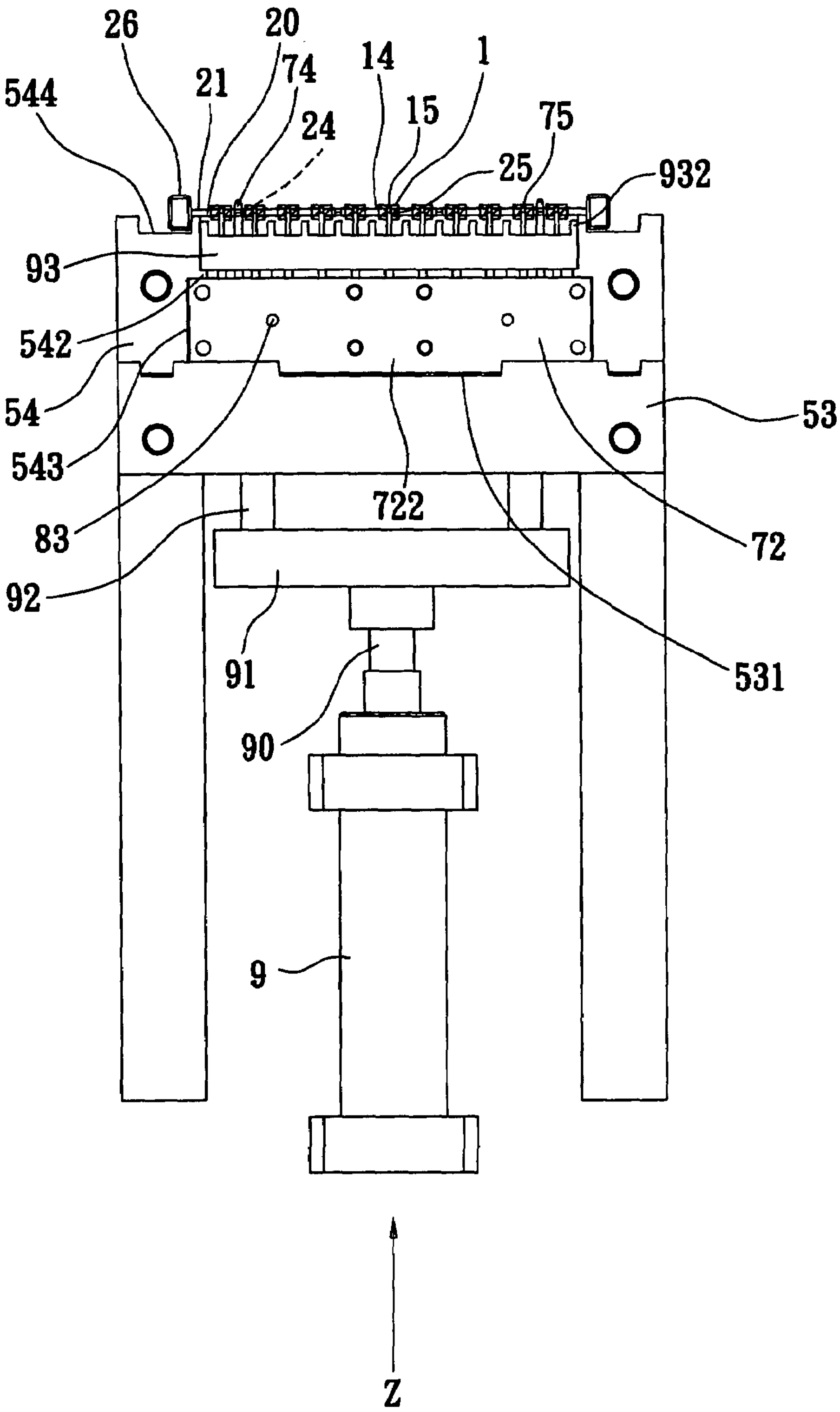
FIG. 9 is a side view without a horizontal reciprocal power source according to the orientation mechanism while the retractable assembly mechanism is in a retracted state according to the present invention.

With respect to FIG. 7 and FIG. 8, the retractable assembly mechanism 7 includes an orientation plate 72, a reception plate 73, an orientation pin 74, a collection pin 75 and a linkage mechanism 8. The orientation plate 72 is arranged alternatingly with the reception plate 73. Each front-end face 70 and rear-end face 71 of the retractable assembly mechanism 7 is the orientation plate 72. The linkage mechanism 8 is arranged between the orientation plate 72 and the reception plate 72 for extending and retracting. The linkage mechanism 8 includes a secure hole 80, a pivot hole 81, a reception hole 82, a pivot pin 83 and a secure pin 84. The secure hole 80, the pivot hole 81 and the reception hole 82 are respectively formed in two adjacent orientation plates 72 and the reception plate 73. Each orientation plate 72 and reception plate 73 has an insertion hole 85 communicating with the secure hole 80. The linkage mechanism 8 further includes a limitation slot 811 formed in the pivot hole 81 and facing a retraction direction of the retractable assembly mechanism 7. The pivot pin 83 has a through hole 832 formed in an end thereof and an expansion limitation portion 831 arranged at an opposing end thereof and facing the retraction direction of the retractable assembly mechanism 7. The pivot pin 83 penetrates through the pivot hole 81 and the secure hole 80. The secure pin 84 inserts into the insertion hole 85, the secure hole 80 and the through hole 832 for orienting the pivot pin 83 in the secure hole 80. The expansion limitation portion 831 mates with the limitation slot 811 for pivoting on the reception hole 82. Referring to FIG. 7 and FIG. 9, the orientation plate 72 has a first lengthwise hole 721 for the orientation pin 74 to connect therein, and the orientation pin 74 has a top exposed by the first lengthwise hole 721. Each strip-like tool 20 corresponds to the orientation plate 72 and the orientation hole 24 sleeves on the top of the orientation pin 74. The reception plate 73 has a second lengthwise hole 731 formed therein for receiving the collection pin 75, and the collection pin 75 has a top exposed by the second lengthwise hole 731. The central hole 15 of each of the double starwheel unit 1 is relatively sleeved on the top of the collection pin 75.

As illustrated in FIG. 5, FIG. 7, and FIG. 9, the housing 5 includes a base 53 and two opposing lateral bases 54. The housing 5 further includes an upper groove 531 formed on the base 53 and parallel to the horizontal direction X. The orientation plate 72 and the reception plate 73 respectively have a lower protrusion (722, 732) mating with the upper groove 531. Each opposing lateral base 54 is bolted on two opposing sides 52 of the base 53 with a plurality of screw bolts 541. The two opposing lateral bases 54 are parallel to the horizontal direction X, and each opposing lateral base 54 has an inner raised strip 542 and a lateral groove 543 formed between the inner raised strip 542 and the base 53. The orientation plate 72 and the reception plate 73 respectively have two opposing edges, where each slidably mates with the inner raised strip 543.

The plate-like assembly fixture 2, which is combined with the strip-like tools 20, and the double starwheel units 1, which is orientated in the module hole 25, are both arranged on the retractable assembly mechanism 7. The lateral base 54 has a concave portion 544 formed in a top face thereof for the two clips 26 straddling the concave portion 544, and allows the two clips 26 to clamp on or off the two opposing ends 21 thereby.

Figure 10:
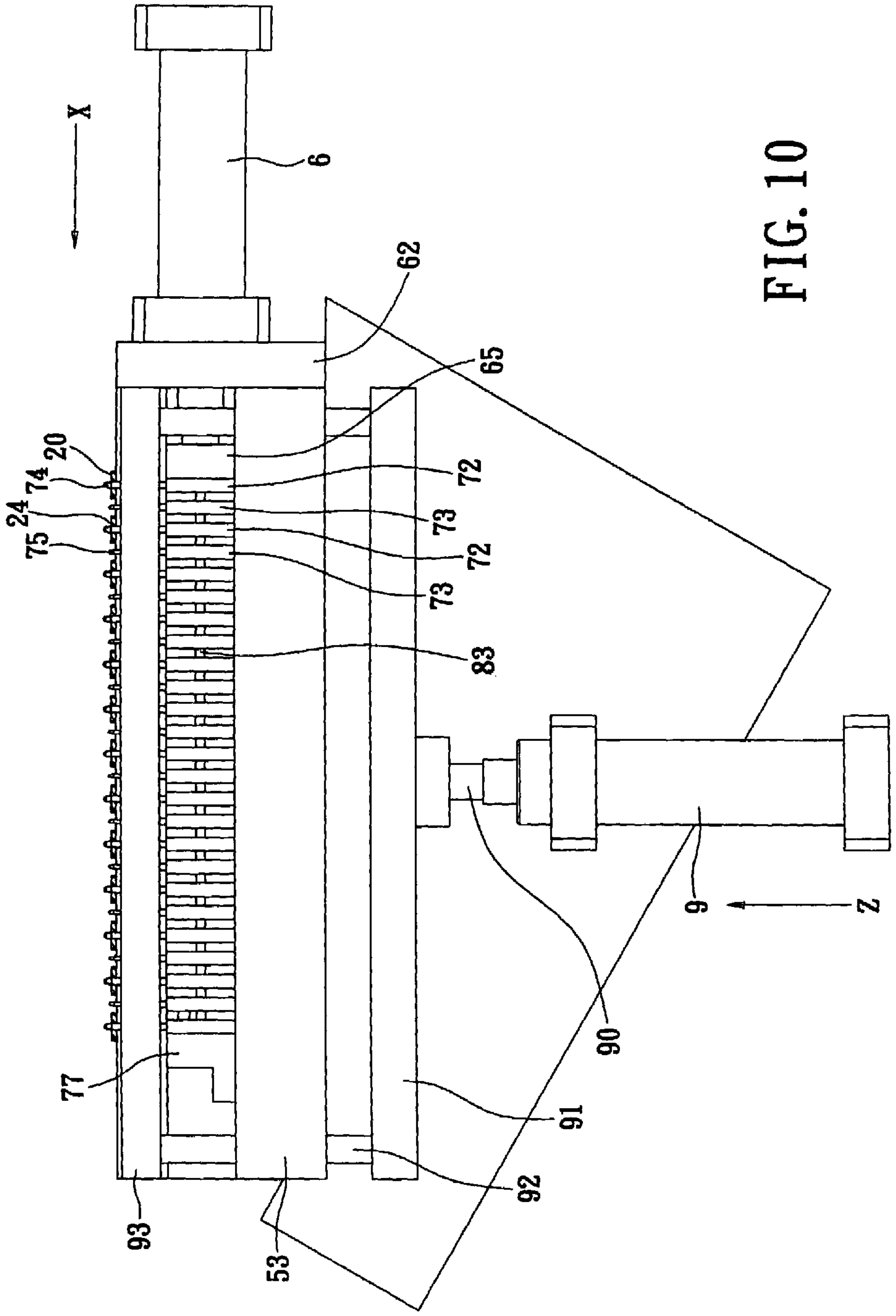
FIG. 10 is a front view without a lateral base and two clips according to the orientation mechanism while the retractable assembly mechanism straddling a plurality of strip-like tools is in the extended state according to the present invention.

In FIG. 5 and FIG. 10, the horizontal reciprocal power source 6 is connected to a fixed plate 62 by a screw bolt 61. The fixed plate 62 is disposed on the base 53 and the lateral base 54 with a screw bolt 63. The orientation plate 72 of the retractable assembly mechanism 7 connects to a connection plate 65 with a screw bolt 64, and the lateral telescopic lever 60 of the horizontal reciprocal power source 6 movably penetrating through a shaft hole 651 of the connection plate 65. The orientation plate 72 of the retractable assembly mechanism 7 has a fixed clip 77 connected thereto by a screw bolt 76, and the fixed clip 77 is connected to the base 53 by a screw bolt 78.

With respect to FIG. 5, FIG. 9 and FIG. 10, the orientation mechanism 3 includes a vertical reciprocal power source 9, a top-retention plate 91, a plurality of pillars 92 and a top plate 93. The vertical reciprocal power source 9 and the top-retention plate 91 are disposes beneath the base 53. The top plate 93 is arranged between the plate-like assembly fixture 2 and the retractable assembly mechanism 7. The vertical reciprocal power source 9 includes a longitudinal telescopic lever 90 defining a vertical direction Z and vertical to the plate-like assembly fixture 2. The top-retention plate 91 connects to the end of the longitudinal telescopic lever 90. The base 53 has a plurality of through holes 532. Each pillar 92 has an end connecting to the top-retention plate 92 and an opposing end penetrating through each of the through holes 532 of the base 53 to connect to the top plate 93, and the top plate 93 restrictedly moves on the inner raised strip 542. The top plate 93 has a plurality of guiding slots 931 formed therein and a plurality of partitions 932 all parallel to the horizontal direction X. The orientation pin 74 and the collection pin 75 respectively penetrate each of the guiding slots 931 and are actuated therein.

In addition, the present invention provides a method adopted for fabricating a plurality of double starwheel units 1 in multiple rows with a multi-hole manner. The method includes:

(a) obtaining a plurality of strip-like tools 20 parallel to each other and arranged increasingly closer to each other to be combined with a plate-like assembly fixture 2, the strip-like tools 20 each having a plurality of recesses 23 formed on two opposing longitudinal sides 22 thereof, and a plurality of module holes 25 (see FIG. 3) each formed by a recess and a next recess relating thereto. The plate-like assembly fixture 2, referring to FIG. 9, straddles a lateral base 54 of an orientation mechanism 3, each strip-like tool 20 has an orientation hole 24 sleeved on an orientation pin 74 of a retractable assembly mechanism 7, which is disposed on the orientation mechanism 3. In a retracted state, two clips 26 of the plate-like assembly fixture 2 are moved and sleeved on an embedded slot of each of the clips 26 on an end of each of the strip-like tools 20 for combining the strip-like tools 20 with the plate-like assembly fixture 2. A longitudinal telescopic lever 90 of a vertical reciprocal power source 9 of the orientation mechanism 3 is raised to retain a plurality partitions 932 of a top plate 93 of the orientation mechanism 3 against the plate-like assembly fixture 2, so that the orientation hole 24 and the module hole 25 are removed from the orientation pin 74 and the collection pin 75 of a retractable assembly mechanism 7.

(b) retaining two sheet-like substrates 19 against upper surface and lower surfaces 28, 29 of the plate-like assembly fixture 2. Each sheet-like substrate 19 has a plurality of starwheels 14 respectively relating to the module holes 25, each of which has a circumference ranging between those of a gear-wheel hole 18 and an external teeth 16 of each of the starwheels 14 (see FIGS. 3 and 4).

(c) covering the plate-like assembly fixture 2 with an exterior mold 4, and closely pressing the external teeth 16 arranged on the upper and lower surfaces 28, 29 of the plate-like assembly fixture 2. The exterior mold 4 includes an injection hole 44 communicating with the module hole 25 and the gear-wheel hole 18 (see FIGS. 3 and 4), the exterior mold 4 is covered with an upper mold 40 and a lower mold 41 thereof by a shaping machine (not shown), and one of the sheet-like substrates 19 in the lower mold 41 to be closely pressed.

Figure 4:
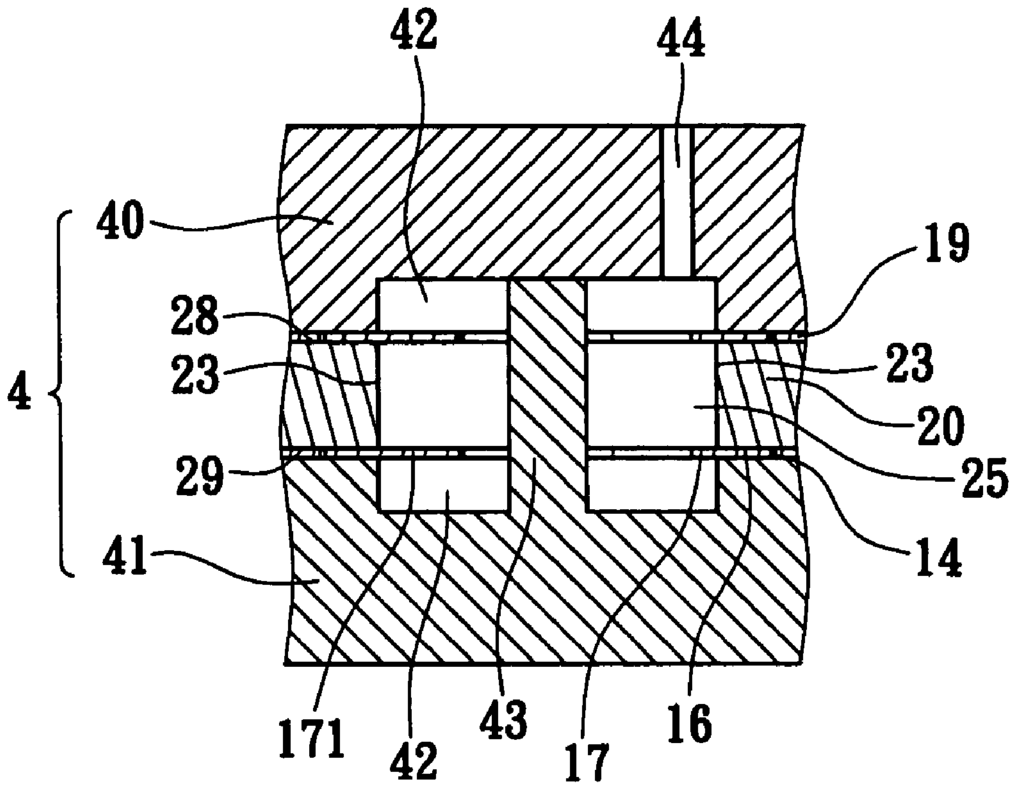
FIG. 4 is an enlarged profile according to a nodule hole of the plate-like assembly fixture and a plurality of module slots of the exterior mold respectively relating to the first and the second starwheels according to the present invention.

(d) injecting a working fluid through the injection hole 44 in the exterior mold 4 and into the module holes 25 therein, and transforming the working fluid into a sleeve 10 to connect the starwheels 14 of the two sheet-like substrates 19 on the upper and the lower surfaces 28, 29 of the plate-like assembly fixture 2 relating to each other for shaping a plurality of double starwheel units 1 respectively oriented in the module holes 25 (with respect FIG. 2 and FIG. 4).

(e) removing the exterior mold 4, which is removed from the plate-like assembly fixture 2 by the shaping machine.

(f) removing a plurality of residents of the two sheet-like substrates 19; the two sheet-like substrates 19 should be clamped by a hook (not shown) to obtain a conjunction point 161 that connects the starwheels. When opened, the hook removes the residents.

(g) separating the strip-like tools 20 from the double starwheel units 1 (see FIGS. 9 and 10). The plate-like assembly fixture 2 is transferred by a carrying machine (not shown) to the orientation mechanism 3 and straddles the partitions 932 on the top plate 93. Simultaneously, the strip-like tools 20 relate to an orientation plate 72 of the retractable assembly mechanism 7, downwardly shifting a longitudinal telescopic lever 90 of the vertical reciprocal power source 9 of the orientation mechanism 3 to carry the plate-like assembly fixture 2 to the lateral base 54 of the orientation mechanism 3. The orientation hole 24 of each of the strip-like tools 20 and a central hole 15 of each of the double starwheel units 1 sleeves on the orientation pin 74 and the collection pin 75 of the retractable assembly mechanism 7, separating the two clips 26 for extending the retractable assembly mechanism 7 by a lateral telescopic lever 60 of a horizontal reciprocal power source 6 of the orientation mechanism 3. The orientation plate 72 of the retractable assembly mechanism 7 separates from a reception plate 73 of the retractable assembly mechanism 7, and the strip-like tools 20 are actuated to slip by the orientation pin 74, so that the module hole 25 expands to be larger than the external teeth 16, and each double-starwheel unit 1 separates from the exterior mold 4 and falls onto the collection pin 74. The lateral telescopic lever 60 recovers to move the strip-like tools 20 closer to the plate-like assembly plate 2.

Some characteristics of the present invention that provides a method of a double starwheel unit in multiple rows with a multi-hole manner, an instrument and the like are listed as follows:

(1) the sleeve 10 connects the two starwheels 14 and both are made in one piece integrally. The yield rate is thus increased, and the failure rate is efficiently decreased.

(2) the strip-like tools 20 are parallel-arranged closer to fabricate the plate-like assembly fixture 2 and the module hole 25, and then the exterior mold 4 is covered and the starwheels 14 closely pressed onto the plate-like assembly fixture 2. Many double starwheel units 1 are thus manufactured in one step.

(3) the strip-like tools 20 are disposed closer or far from each other to engage with or disengage from the double starwheel units 1 in the extended state or retracted state of the retractable assembly mechanism 7. The efficiency of formation and removal is thus increased.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A method adopted for fabricating a plurality of double starwheel units in multiple rows with a multi-hole manner, the method comprising:

(a) obtaining a plurality of strip-like tools parallel to each other and arranged increasingly closer to be combined with a plate-like assembly fixture, the strip-like tools each having a plurality of recesses formed in two opposing longitudinal sides thereof, and a plurality of module holes formed by each of the recesses and a next recess relating thereto;

(b) retaining two sheet-like substrates against an upper surface and a lower surfaces of the plate-like assembly fixture, the two sheet-like substrates each having a plurality of starwheels respectively relating to the module holes, each of the starwheels having a gear-wheel hole and external teeth wherein each has a circumference ranging between that of the gear-wheel hole and that of external teeth of each of the starwheels;

(c) covering the plate-like assembly fixture with an exterior mold, and closely pressing the external teeth arranged on the upper and lower surfaces of plate-like assembly fixture;

(d) injecting a working fluid into an injection hole in the exterior mold and into the module holes therein, and transforming the working fluid into a sleeve to connect the starwheels of the two sheet-like substrates on the upper and the lower surfaces of the plate-like assembly fixture relating to each other for shaping a plurality of double starwheel units respectively oriented in the module holes;

(e) removing the exterior mold;

(f) removing a plurality of residents of the two sheet-like substrates; and (g) separating the strip-like tools from the double starwheel units.

2. The method of claim 1, wherein the plate-like assembly fixture of step (a) straddles a lateral base of an orientation mechanism, the strip-like tools each having an orientation hole sleeved on an orientation pin of a retractable assembly mechanism, wherein the retractable assembly mechanism is disposed on the orientation mechanism in a retracted state, and step (a) further includes moving two clips of the plate-like assembly fixture and sleeved an embedded slot of each of the clips on an end of each of the strip-like tools for combining the strip-like tools with the plate-like assembly fixture, raising a longitudinal telescopic lever of a vertical reciprocal power source of the orientation mechanism up for a plurality partitions of a top plate of the orientation mechanism to be retained against the plate-like assembly fixture, so that the orientation hole and the module hole removed the orientation pin and the collection pin of a retractable assembly mechanism.

3. The method of claim 2, wherein the exterior mold of step (c) further includes an upper mold and a lower mold, and step (c) further includes arranging one of the sheet-like substrates in the lower mold to be closely pressed.

4. The method of claim 3, wherein the retractable assembly mechanism of the orientation mechanism of step (g) is in a retracted state, while the plate-like assembly fixture straddles the partitions of the top plate of the orientation mechanism, the strip-like tools relates to an orientation plate of the retractable assembly mechanism, downwardly shifting a longitudinal telescopic lever of the vertical reciprocal power source of the orientation mechanism to carry the plate-like assembly fixture to the lateral base of the orientation, the orientation hole of each of the strip-like tools and a central hole of each of the double starwheel units sleeves on the orientation pin and the collection pin of the retractable assembly mechanism, further separating the two clips for extending out the retractable assembly mechanism by a lateral telescopic lever of a horizontal reciprocal power source of the orientation mechanism, the orientation plate of the retractable assembly mechanism separates from a reception plate of the retractable assembly mechanism, the strip-like tools are actuated to slip by the orientation pin, so that the module hole expands to be larger than the external teeth, and each double starwheel unit separates from the exterior mold and falls to sleeve on the collection pin.

* * * * *